D. MILLER.
MILLING MACHINE FIXTURE.
APPLICATION FILED AUG. 25, 1916.

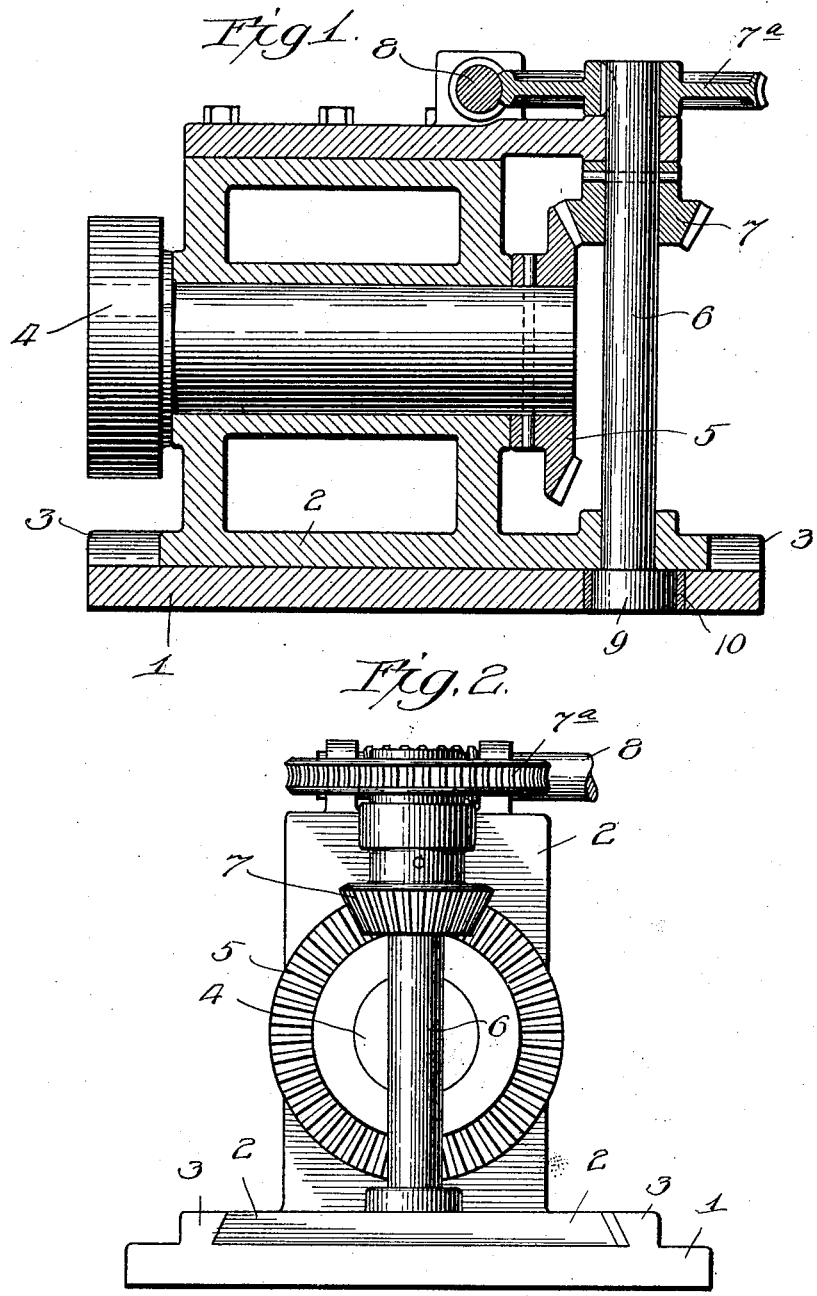

1,316,317.

Patented Sept. 16, 1919.
2 SHEETS—SHEET 2.

UNITED STATES PATENT OFFICE.

DORR MILLER, OF CHICAGO, ILLINOIS, ASSIGNOR TO THE MILLER TRANSMISSION COMPANY, OF NEW YORK, N. Y., A CORPORATION OF MAINE.

MILLING-MACHINE FIXTURE.

1,316,317.  Specification of Letters Patent.  Patented Sept. 16, 1919.

Application filed August 25, 1916. Serial No. 116,800.

*To all whom it may concern:*

Be it known that I, DORR MILLER, a citizen of the United States, residing at Chicago, county of Cook, State of Illinois, have invented a certain new and useful Improvement in Milling-Machine Fixtures, and declare the following to be a full, clear, and exact description of the same, such as will enable others skilled in the art to which it pertains to make and use the same, reference being had to the accompanying drawings, which form a part of this specification.

My invention has for its object to produce a simple attachment for milling machines by means of which a piece of work may be rotated and at the same time be reciprocated in the direction of the axis of rotation in order that a stationary cutting tool or a cutting tool having only a rotary motion about a stationary axis, will cut a cam shaped path. Specifically considered, my invention may be said to have for its object to produce a simple work holder for rotating and reciprocating the driven members of the differential gearing disclosed in my prior application No. 13,616, filed on March 11, 1915, during the shaping of the cam faces or clutch faces thereon. But, of course, my invention may be used for other purposes.

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 1 is a central vertical section through an attachment arranged in accordance with one form of my invention;

Fig. 2 is an end view looking toward the left from the right hand end of Fig. 1;

Figure 3:
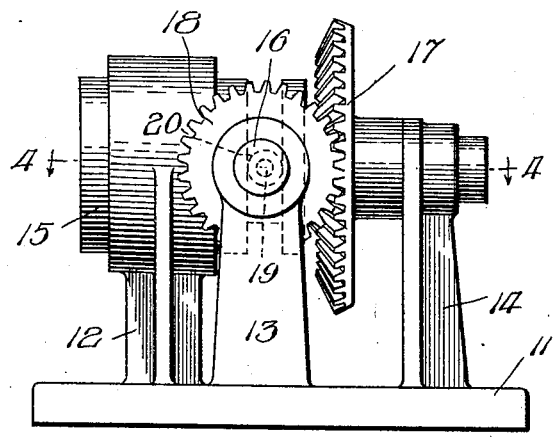
Fig. 3 is a side elevation of a modified form of attachment.

Referring to Figs. 1 and 2, 1 represents a base plate adapted to be secured in any suitable way upon the bed of a milling machine. Resting upon the member 1 is a frame, 2, slidable between guides, 3, on the base plate. The frame 3 carries a rotatable work holder, 4, having at one end a bevel gear, 5. Mounted on the frame at right angles to the axis of the work holder is a rotatable shaft, 6, having a pinion, 7, which meshes with the gear wheel 5. On one end of the shaft, 6, is a worm wheel, $7^a$, meshing with a worm, 8, adapted to be connected in any suitable way to some rotatable part of the machine to which the attachment is applied. On the opposite end of the shaft 6 is an eccentric, 9, extending into a bearing, 10, in the base plate.

It will be seen that when the shaft 6 is rotated, it will cause the work holder to turn and the shaft itself, and therefore the frame 2 and the work holder, to be reciprocated in the direction of the axis of the work holder, the extent of reciprocation depending upon the throw of the eccentric. In the arrangement shown, the pinion 7 has half the number of teeth of the gear wheel 5 and therefore the work holder will be reciprocated through two complete cycles for each revolution thereof. Consequently if one of the driven members of my aforesaid differential gear is held in the work holder and a suitable milling cutter is brought in proper relation thereto, it will be seen that the desired undulating cam surface having two high points and two low points will be accurately produced. For any other desired relation between the rotary and reciprocatory movements, it is simply necessary to change the gear ratios to produce the desired effect.

Figure 4:
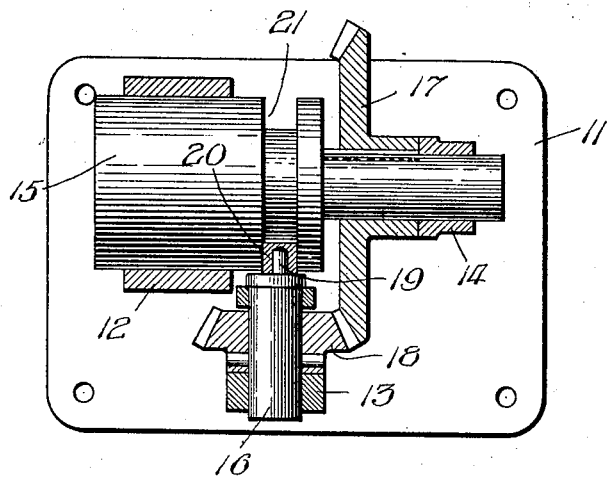
Fig. 4 is a section taken approximately one line 4—4 of Fig. 3.

In Figs. 3 and 4 I have illustrated a modification in which the base plate and the frame are combined. Referring to these figures, 11 represents a base plate similar to the plate 1 having upwardly projecting standards, 12, 13 and 14. A rotary work holder, 15, is supported in the standards 12 and 14 while a rotary driving shaft, 16, is mounted in the standard 13 at right angles to the axis of the work holder. Splined on the work holder is a bevel gear, 17, meshing with a complementary pinion, 18, on the shaft 16. On the inner end of the shaft, 16, is a pin, 19, set eccentrically and provided with an anti-friction roller, 20; the pin and its roller extending into an annular groove, 21, in the periphery of the work holder. It will be seen that when the shaft 16 is rotated, it causes the work holder to rotate, while the eccentrically set crank pin causes the work holder to be reciprocated in the direction of its axis. It will thus be seen that the principle of this device is the same as that heretofore described, the difference between the two being simply as to details.

While I have illustrated and described with particularity only two simple forms of my invention, I do not desire to be limited to the exact structural details thus illustrated and described; but intend to cover all forms and arrangements which come within the terms employed in the definitions of my invention constituting the appended claims.

I claim:

1. In a machine of the character described, a supporting base, a work holder mounted on the base, means for rotating the work holder, and a crank or eccentric for reciprocating the work holder on the base in definite time relation to its rotary movements.

2. In a machine of the character described, a base, a supporting frame slidably mounted on the base, a rotatable work holder, means for rotating the work holder consisting of a shaft suitably journaled and gearing from the shaft to the work holder and an eccentric on said shaft operating in a bearing in the base to reciprocate the frame and work holder in definite time relation to the rotary movement of the work holder substantially as described.

In testimony whereof, I sign this specification.

DORR MILLER.

Copies of this patent may be obtained for five cents each, by addressing the "Commissioner of Patents, Washington, D. C."